United States Patent
Sardella

(10) Patent No.: US 7,441,078 B1
(45) Date of Patent: Oct. 21, 2008

(54) MANAGING DISK DRIVE STATUS

(75) Inventor: Steven D. Sardella, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 200 days.

(21) Appl. No.: 11/324,452

(22) Filed: Jan. 3, 2006

(51) Int. Cl.
G06F 12/00 (2006.01)
G06F 13/00 (2006.01)
G06F 13/28 (2006.01)

(52) U.S. Cl. .......................... 711/112; 714/37

(58) Field of Classification Search .......... 711/112; 714/37
See application file for complete search history.

(56) References Cited

U.S. PATENT DOCUMENTS

2006/0112249 A1* 5/2006 Bomhoff et al. ............ 711/167
2006/0114758 A1* 6/2006 Jones et al. ............... 369/30.01

OTHER PUBLICATIONS

Canon EOS 10D digital camera instruction manual, Canon, 2003, p. 22.*

* cited by examiner

Primary Examiner—Tuan V. Thai
Assistant Examiner—Edward J Dudek
(74) Attorney, Agent, or Firm—Krishnendu Gupta; Jason A. Reyes

(57) ABSTRACT

Disk drive status is managed. A detection is made that a disk drive has asserted its Enable Bypass signal. It is determined whether the drive has asserted and de-asserted its Fault LED signal in a pattern of transitions signifying that the drive cannot operate at a specified data rate.

20 Claims, 5 Drawing Sheets

MANAGING DISK DRIVE STATUS

FIELD OF THE INVENTION

The present invention relates generally to managing disk drive status, and more particularly to managing disk drive status in data storage systems.

BACKGROUND OF THE INVENTION

The need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss. And computing systems of all types are not only accommodating more data but are also becoming more and more interconnected, raising the amounts of data exchanged at a geometric rate.

To address this demand, modern data storage systems ("storage systems") are put to a variety of uses. For example, they are coupled with host systems to store data for purposes of product development, and large storage systems are used by financial and other institutions to store critical data in large databases.

Fibre Channel is a high performance, serial interconnect standard for bidirectional, point-to-point communications between servers, storage systems, workstations, switches, and hubs. Fibre Channel standards are described by the Fibre Channel Industry Association (FCIA) (http://www.fibrechannel.org).

As Fibre Channel technology advances, an increase in the data transmission speed of the Fibre Channel links becomes increasingly desirable. For example, a new Fibre Channel standard exists that discloses a 4.250 gigabytes per second (Gb/s) data rate ("4 G"), which is an increase from a well established 2.1250 Gb/s data rate ("2 G").

A Fibre Channel ("FC") disk drive compliant with the SFF-8045 rev. 4.7 standard ("SFF-8045") has Enable Bypass signals –ENBL BYP CH1 and –ENBL BYP CH2 that control Port Bypass Circuits (PBC) located external to the drive. The PBC allows an FC loop to remain functional in the event of a drive failure or removal. Signal –ENBL BYP CH1 controls the PBC for FC channel 1, and signal –ENBL BYP CH2 controls the PBC for FC channel 2. When these Enable Bypass signals are asserted (low), the PBC bypasses the drive on the associated channel.

Further in accordance with SFF-8045, a –DRIVE PRESENT signal ("drive insert" or "drive inserted" signal) is connected to the drive's ground plane. In an enclosure receiving the drive, a backplane can optionally use the signal to passively detect the presence of the drive by using a detection circuit connected to a tie up resistor. When the drive is not installed, the detection circuit can detect the signal provided through the tie up resistor. When the drive is installed, the signal is grounded through the drive's ground signal and the grounded state can be detected by the detection circuit.

Further in accordance with SFF-8045, a FAULT LED OUT ("Fault LED") signal is driven by the drive when the drive has established or detected any of the following conditions.

The drive is asserting both of the Enable Bypass signals.
The drive has detected an internal failure.
The drive has been instructed by the host to turn on the Fault LED (light emitting diode).

Electrically, the Fault LED signal can pull down the cathode of an LED using an open collector or open drain driver circuit. The anode is attached to an appropriate supply through a current limiting resistor. The LED and the current limiting resistor are external to the drive.

The Enable Bypass signals are passively enabled when the drive is inserted and remain enabled until the drive has performed appropriate internal initialization and has determined that it can communicate at a specified data rate on the FC channels.

SUMMARY OF THE INVENTION

Disk drive status is managed. A detection is made that a disk drive has asserted its Enable Bypass signal. It is determined whether the drive has asserted and de-asserted its Fault LED signal in a pattern of transitions signifying that the drive cannot operate at a specified data rate.

One or more implementations of the invention may provide one or more of the following advantages.

A data storage system can determine whether a disk drive is bypassed in the system because it does not support the system's data rate, or because the drive has a different problem (e.g., the drive is malfunctioning). This determination can be made without any hardware changes in the data storage system or the disk drive.

Other advantages and features will become apparent from the following description, including the drawings, and from the claims.

DETAILED DESCRIPTION

The following co-pending patent applications, which are assigned to the same assignee as the present application, are incorporated by reference herein in their entirety: U.S. patent application Ser. No. 11/096,030, filed Mar. 31, 2005, reference no. EMC-05-032, entitled "MANAGING MULTIPLE DATA RATES IN DATA STORAGE SYSTEMS", and U.S. patent application Ser. No. 11/169,465, filed Jun. 29, 2005, reference no. EMC-05-032CIP1, entitled "CONTROLLING DATA RATE CHANGES IN DATA STORAGE SYSTEMS".

Figure 1:
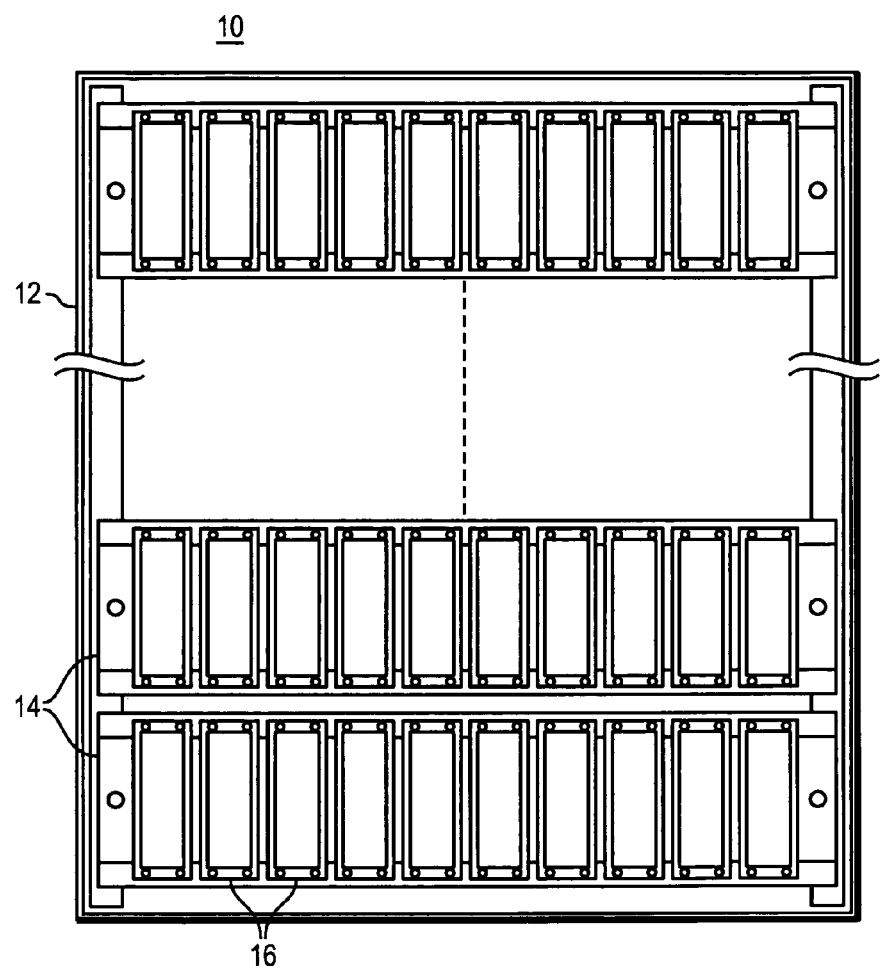
FIG. 1 is a representation of a rack mount system including several storage enclosures.
Figure 2:
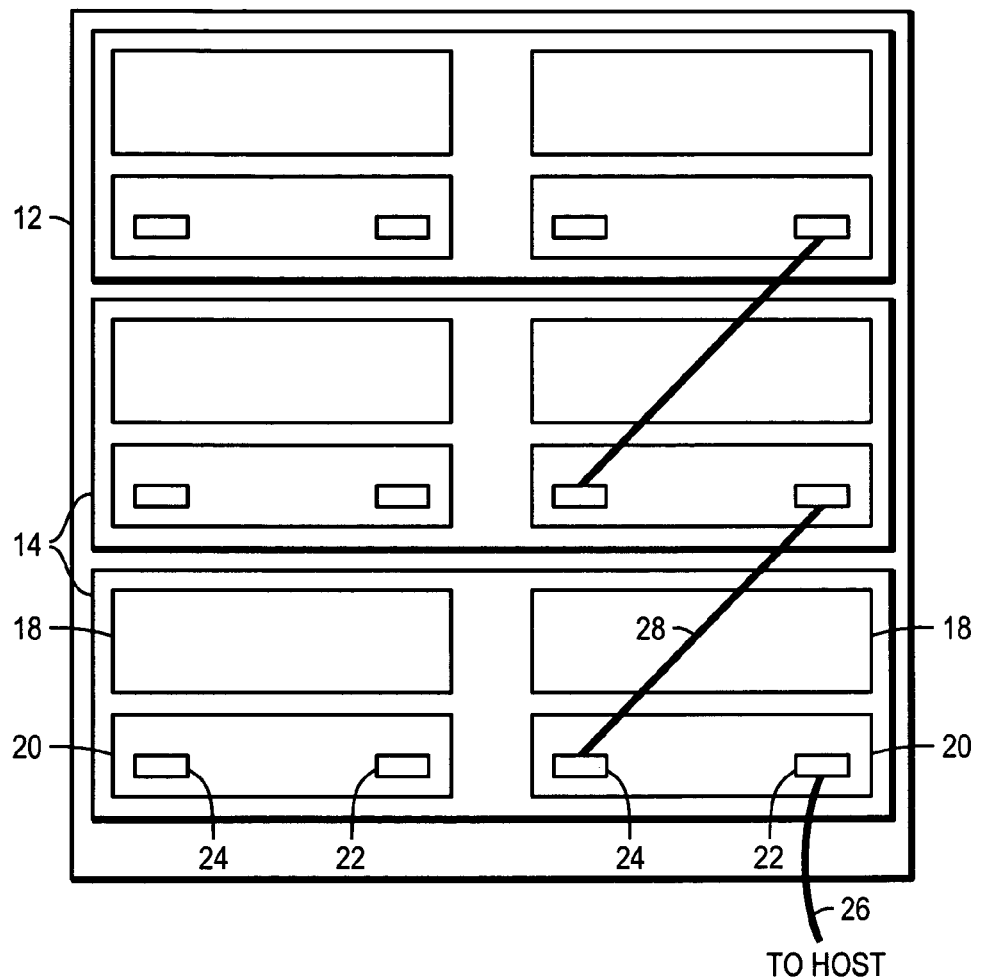
FIG. 2 is a rear view of the rack mount system and storage enclosures of FIG. 1.

Referring to FIG. 1 of the present application, there is shown an example of a storage system 10 in which the present invention may be employed. A rack mount cabinet 12 includes several storage enclosures 14. Each storage enclosure 14 includes several disk drives 16. The disk drives and the enclosures are preferably interconnected via a serial bus loop or ring architecture, e.g., FC-AL. In FIG. 2 there is shown a rear view of the rack mount cabinet 12 and the storage enclosure 14. Each storage enclosure includes two power supplies 18, and two link control cards 20. The power supplies 18 and link control cards 20 are coupled to the disk drives 16 via a midplane within the chassis (not shown in FIG. 2). The link control card 20 serves to interconnect the disks and enclosures on the FC-AL.

Each link control card 20 includes a primary port 22 and an expansion port 24. These ports are used to link the storage enclosures together on a single FC-AL. A cable 26 may come from a host or from another storage system, and plugs into the primary port 22. The FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner to form the FC-AL. Thus, all the disk drives 16 are interconnected on the same FC-AL.

Each link control card 20 is capable of controlling all the disks 16 in a given enclosure.

The storage system also supports SFF-8045 and each disk drive used with the storage system conforms to SFF-8045.

SFF-8045 specifies a Device Control function (also referred to as DEV_CTRL_CODE) which may be used by the storage system to control certain drive functions.

In particular, the storage system uses three DEV_CTRL_CODE signals DEV_CTRL_CODE2 (most significant bit), DEV_CTRL_CODE1, DEV_CTRL_CODE0 (least significant bit) to provide a binary code to the drive to control functions such as Fibre Channel link rate (data rate), power failure warning, and hard reset. Features described below make use of the Fibre Channel data rate function.

With respect to data rate, following power-on-reset which leaves the drive in a bypassed state on the FC ports, the drive waits a minimum of 250 milliseconds and verifies that the DEV_CTRL_CODE signals have not changed for 5 milliseconds before accepting the link rate corresponding to the value indicated by the DEV_CTRL_CODE signals. If the value does not correspond to a supported data rate, the drive remains in the bypassed state on the FC ports. The drive continues to read the DEV_CTRL_CODE signals waiting for a value corresponding to a supported data rate.

After the drive reads a value that corresponds to a supported data rate, it reads the DEV_CTRL_CODE signals at least once per second to determine whether a change of data rate is requested. When the drive reads a value corresponding to a different data rate, it waits at least 30 milliseconds before accepting the new value as valid. If the new value is still present at the end of the 30 millisecond period, the drive performs the equivalent of a power-on-reset and attempt to operate at the new data rate.

Figure 3:
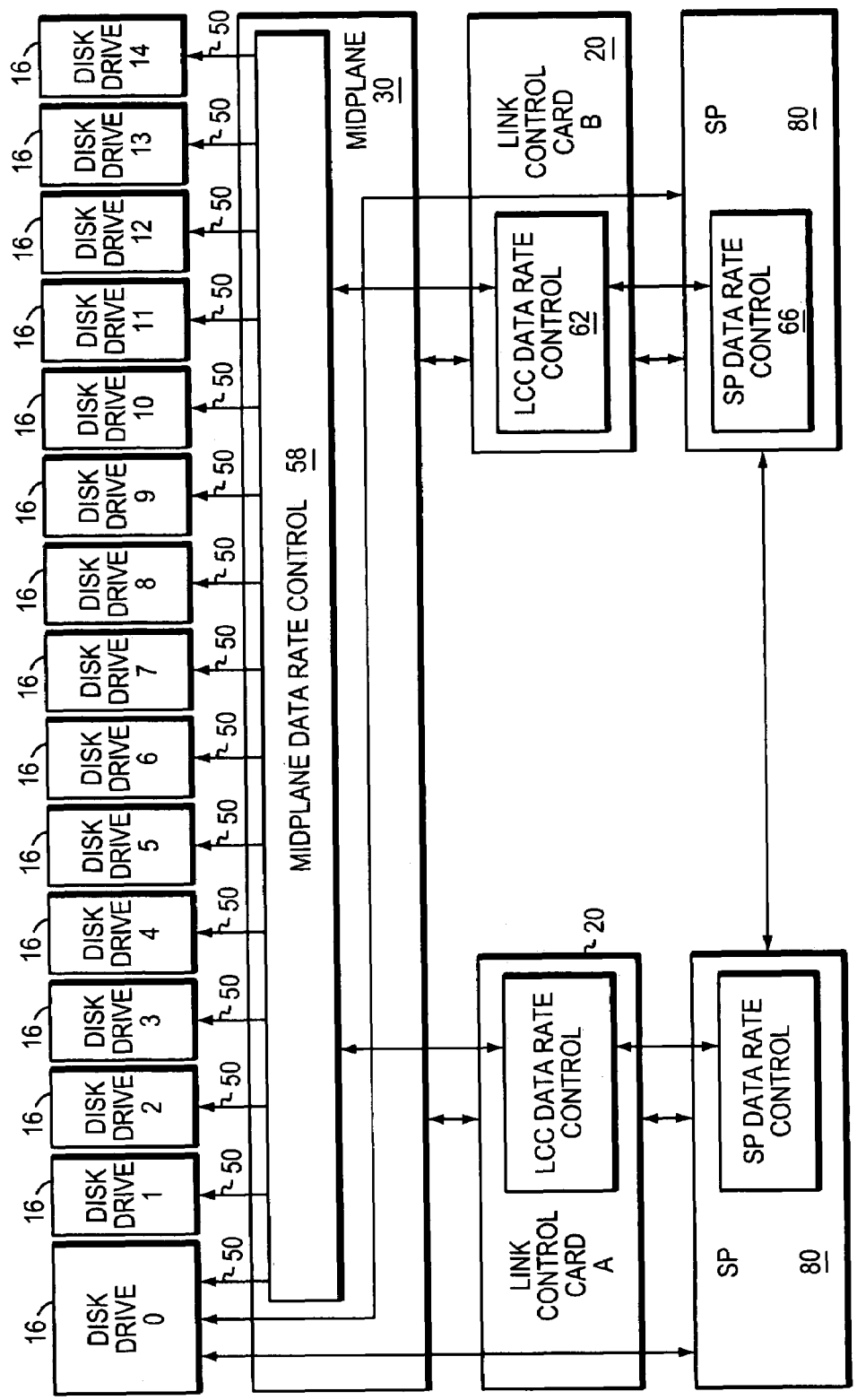
FIGS. 3-4 are schematic representations of link control cards coupled to disk drives in the system of FIG. 1.

FIG. 3 illustrates communication among drives 16, midplane 30, LCCA and LCCB 20, and storage processors (SP) 80. The DEV_CTRL_CODE signals described above are here denoted signals 50 and are supplied to drives 16 based on logic (which may include circuitry, digital circuitry, firmware, and/or software) including midplane data rate control logic 58 and LCC data rate control logic 62, and in at least some embodiments storage processor data rate control logic 66 as well, as described in the co-pending patent applications identified above.

For the purpose of the description provided herein, drives 16 may be understood to be essentially identical in their respective constructions and operations. Accordingly, in order to avoid unnecessary redundancy in the Description, reference will be made to a single one (drive 0) as an example of drives 16.

Figure 4:
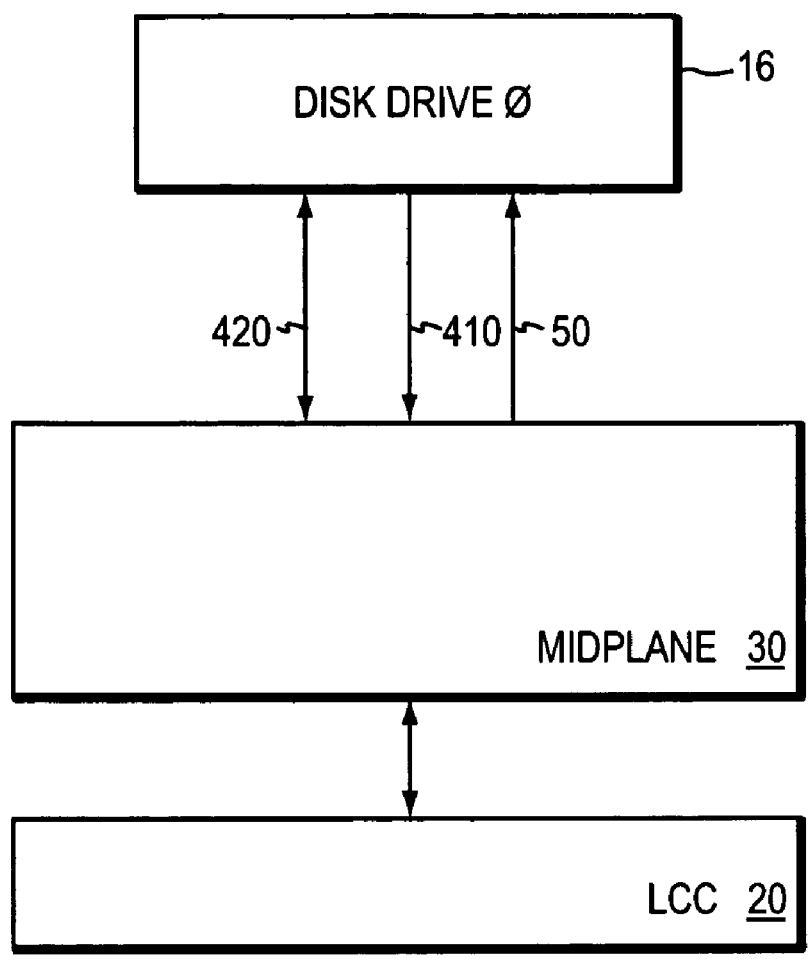

FIG. 4 illustrates particular aspects of SFF-8045 based interaction among drive 0, midplane 30, and LCCs 20. In particular, drive 0 has its Enable Bypass signals 410 as described herein, and its Fault LED signal 420 as described herein.

Drive 0 uses signals 50 to determine its assigned data rate. However, if it cannot run at that data rate, it asserts its Enable Bypass signals 410 to disengage from the FC loops.

In particular, the original programming of drive 0 describes the data rates that drive 0 supports. Drive 0 asserts the Enable Bypass signals if it determines that signals 50 are specifying a data rate that it does not support. In response, logic on LCC 20 automatically bypasses drive 0 on both loops—drive 0 is not available for FC communication. This response serves as a useful protection mechanism, particularly in a traditional FC loop in which, if one device is running at the wrong data rate, all communication throughout the loop is blocked because communication signals need to pass through all devices in the loop. Even if a loop switch is used to provide point-to-point communications with drive 0, the loop switch is compliant with FC protocols and bypasses drive 0 if drive 0 asserts its Enable Bypass signals.

In particular, if drive 0 is a 2 G drive and the enclosure's loops are running at 4 G, drive 0 asserts its Enable Bypass signals.

Drive 0 executes a built-in self-test after power up or a hard reset, which self-test includes checking onboard memory and drive media. During execution of the self-test, drive 0 asserts its Enable Bypass signals. If drive 0 passes its self-test, it de-asserts its Enable Bypass signals. If not, drive 0 continues to assert its Enable Bypass signals so that it does not join the FC loops, and drive 0 also drives its Fault LED signal 420 as described below.

Conventionally, when a drive's Enable Bypass signals remain asserted, the drive is treated as malfunctioning, is reported as such, and therefore is the subject of a service procedure potentially including replacement.

Thus, drive 0 asserts its Enable Bypass signals under multiple circumstances, including: (1) when it cannot operate at the data rate specified by signals 50 (data rate mismatch) and (2) when it has detected a drive fault (i.e., when it is malfunctioning in some way).

As a result, a system capable of different data rates can detect that such a drive has been inserted by its drive insert signal, but cannot determine from the drive's Enable Bypass signal assertion whether the drive has a data rate mismatch or is malfunctioning. And the system's error reporting similarly cannot differentiate based on the drive's Enable Bypass signal assertion. For example, if a fully functional drive has a data rate mismatch but is reported as malfunctioning, the user may treat the drive as a defective drive.

Since the drive is bypassed, it cannot be queried via FC to determine its data rate capabilities, and SFF-8045 does not provide for an exchange of messages with the drive.

SFF-8045 specifies that the drive's Fault LED signal is asserted by the drive when the drive asserts its Enable Bypass signals. The Fault LED signal is bidirectional such that the signal can be asserted by one or more of the drive and the LCCs, and the state of the signal can be read by one or more LCC. The Fault LED signal is wire or'd such that it cannot be de-asserted if the drive or any LCC has asserted it. Accordingly, without inter-LCC coordination, an LCC that reads the Fault LED signal cannot determine whether the signal is being asserted by the drive or the other LCC.

Figure 5:
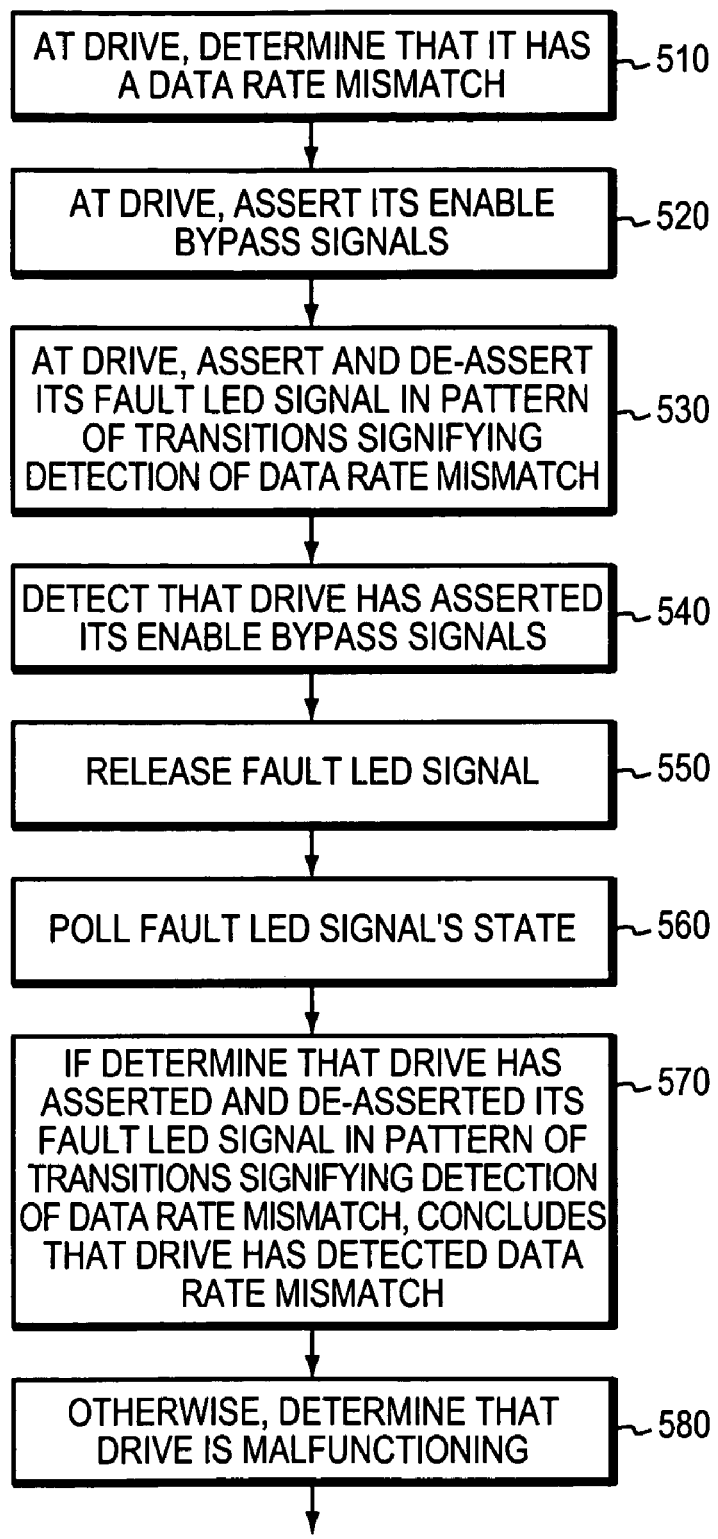
FIG. 5 is a flowchart of a procedure for use in the system of FIG. 1.

In accordance with the invention, the drive and LCC execute as follows to allow the LCCs to determine whether the drive has detected a data rate mismatch (FIG. 5).

The drive determines that it has a data rate mismatch (step 510).

The drive asserts its Enable Bypass signals (step 520).

The drive asserts and de-asserts its Fault LED signal in a pattern of transitions signifying detection of a data rate mismatch (step 530).

Each LCC detects that the drive has asserted its Enable Bypass signals (step 540).

Each LCC releases (stops driving) the Fault LED signal (step 550).

Each LCC polls the Fault LED's state (step 560).

If the LCC determines that the drive has asserted and de-asserted its Fault LED signal in a pattern of transitions signifying detection of a data rate mismatch, the LCC concludes that the drive has detected a data rate mismatch (step 570).

Otherwise, the LCC determines that the drive is malfunctioning (step 580).

The pattern of transitions may be produced under instructions implemented in drive firmware.

In a particular implementation, the pattern of transitions amounts to asserting and de-asserting the signal at regular intervals (e.g., every half second) so that the Fault LED signal is asserted during one interval, is de-asserted during the next interval, and continues to alternate in subsequent intervals. In such a case, the LCC can detect the pattern by polling at half-intervals (e.g., every quarter second) or more frequently. Other examples of intervals include one second or two seconds. Any interval may be used as long as the LCC can poll quickly enough to detect the pattern.

In another particular implementation, the pattern of transitions describes a particular code, e.g, 81, which may be signaled in Morse code or another signaling scheme.

In another particular implementation, the pattern of transitions is a small number of transitions (e.g., 1 or 2 transitions) such that the fact that the Fault LED signal is not solidly asserted or de-asserted during a particular period of time signifies detection of a data rate mismatch.

In general, the pattern of transitions may be or include any pattern detectable by the LCC and distinguishable by the LCC from non-pattern presentations of the signal.

Depending on the implementation, the LCC may try only in certain circumstances to determine whether the drive has detected a data rate mismatch. For example, if the associated FC loops are running at 2 G and all of the drives of interest are known to be capable of 2 G, the LCC may immediately interpret Fault LED signal assertion to mean that the drive is malfunctioning. On the other hand, if the associated FC loops are running at 4 G, the LCC may respond to Fault LED signal assertion by trying as described above to determine whether the drive has detected a data rate mismatch.

In a particular LCC and midplane implementation, an LCC can drive the Fault LED signal by writing to a first set of registers and can read the state of the Fault LED signal by reading from a second set of registers. In the determination of whether the drive has detected a data rate mismatch, each LCC causes the first set of registers to stop driving the Fault LED signal.

If an implementation is provided in which the Fault LED signal is driven only by the drive, in the determination of whether the drive has detected a data rate mismatch, the Fault LED signal can be read without first releasing the signal.

Since the determination of whether the drive has detected a data rate mismatch is not dependent on the particular data rates involved, it can be used for mismatches relating to any data rates, e.g., 1.0625 Gbps, 2.125 Gbps, 4.25 Gbps, 8.5 Gbps, 10.51875 Gbps, and/or 17 Gbps.

Other embodiments are within the scope of the following claims. For example, the embodiment described above is able to execute at firmware speeds, but in other embodiments one or more portions of the determination of whether the drive has detected a data rate mismatch may be may be implemented, entirely or in part, in hardware, firmware, or software, or some combination of hardware, firmware, and software.

What is claimed is:

1. A computer program product having a computer readable storage medium operable to store computer program logic embodied in computer program code encoded as a set of processor based instructions thereon, that, when executed by the processor cause the computer to perform steps for use in managing disk drive status, the computer program logic comprising:

first logic detecting that a disk drive has asserted its Enable Bypass signal, the Fault LED signal being wire or'd such that the Fault LED signal cannot be de-asserted if the drive or another device has asserted the Fault LED signal; and second logic determining whether the drive has asserted and de-asserted its Fault LED signal in a pattern of transitions signifying that the drive cannot operate at a specified data rate; and third logic allowing the drive, based on the determination to be treated as a non-defective drive.

2. The computer program logic of claim 1, wherein the disk drive is compatible with an SFF-8045 standard.

3. The computer program logic of claim 1, further comprising:

logic determining that the disk drive has a data rate mismatch.

4. The computer program logic of claim 1, further comprising:

logic asserting the disk drive's Enable Bypass signals.

5. The computer program logic of claim 1, further comprising:

logic releasing the Fault LED signal.

6. The computer program logic of claim 1, further comprising:

logic polling the Fault LED signal's state.

7. The computer program logic of claim 1, further comprising:

logic determining that the disk drive is malfunctioning.

8. Apparatus comprising:

first and second data link devices;

a data storage device receiving a set of control signals controllable by signals from both first and second data link devices, the set of control signals being capable of directing a data storage device to operate a specified data rate; and a midplane device connecting the first and second data link devices to the data storage device;

wherein the first data link device has first logic detecting that the data storage device has asserted its Enable Bypass signal, the Fault LED signal being wire or'd such that the Fault LED signal cannot be de-asserted if the data storage device or another device has asserted the Fault LED signal; and wherein the first data link device has second logic determining whether the data storage device has asserted and de-asserted its Fault LED signal in a pattern of transitions signifying that the data storage device cannot operate at a specified data rate.

9. A method for use in managing disk drive status, the method comprising:

detecting that a disk drive has asserted its Enable Bypass signal the Fault LED signal being wire or'd such that the Fault LED signal cannot be de-asserted if the drive or another device has asserted the Fault LED signal;

determining whether the drive has asserted and de-asserted its Fault LED signal in a pattern of transitions signifying that the drive cannot operate at a specified data rate; and based on the determination, allowing the drive to be treated as a non-defective drive.

10. The method of claim 9, wherein the disk drive is compatible with an SFF-8045 standard.

11. The method of claim 9, further comprising:

determining that the drive cannot operate at a specified data rate due to a data rate mismatch.

12. The method of claim 9, further comprising:

at the disk drive, asserting the disk drive's Enable Bypass signals.

13. The method of claim 9, further comprising:

at a control card, releasing the Fault LED signal.

14. The method of claim 9, further comprising:

at a control card, polling the Fault LED signal's state.

15. The method of claim 9, further comprising:

based on the determination, determining whether the disk drive is malfunctioning.

16. The method of claim 9, wherein the pattern of transitions includes asserting and de-asserting the Fault LED signal at regular intervals.

17. The method of claim 9, wherein the pattern of transitions describes a code.

18. The method of claim 9, wherein the pattern of transitions includes fewer than 3 transitions.

19. The method of claim 9, wherein the pattern of transitions includes a detectable pattern that is distinguishable from non-pattern presentations of the Fault LED signal.

20. The method of claim 9, further comprising:

analyzing the Fault LED signal only if the disk drive is attached to a 4 G system.

* * * * *